(12) United States Patent
Snyder et al.

(10) Patent No.: US 11,413,535 B2
(45) Date of Patent: *Aug. 16, 2022

(54) PHYSICS ENGINE USING DEPTH INFORMATION

(71) Applicant: Kabam, Inc., San Francisco, CA (US)

(72) Inventors: Cody Snyder, San Francisco, CA (US); Russell Warneboldt, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,209

(22) Filed: Feb. 10, 2021

(65) Prior Publication Data

US 2021/0162304 A1 Jun. 3, 2021

Related U.S. Application Data

(63) Continuation of application No. 15/471,527, filed on Mar. 28, 2017, now Pat. No. 10,926,176.

(51) Int. Cl.
*A63F 13/573* (2014.01)
*G06T 13/60* (2011.01)
*G06T 15/20* (2011.01)
*G06T 15/04* (2011.01)

(52) U.S. Cl.
CPC ............ *A63F 13/573* (2014.09); *G06T 13/60* (2013.01); *G06T 15/04* (2013.01); *G06T 15/20* (2013.01); *G06T 2210/21* (2013.01)

(58) Field of Classification Search
CPC .... A63F 13/573; G06T 2210/21; G06T 13/60
See application file for complete search history.

(56) References Cited

U.S. PATENT DOCUMENTS

| | | | |
|---|---|---|---|
| 5,764,233 A | 6/1998 | Brinsmead |
| 6,765,573 B2 | 7/2004 | Kouadio |
| 6,947,044 B1 | 9/2005 | Kulas |
| 7,339,590 B1 | 3/2008 | Moskal |
| 8,619,087 B2 | 12/2013 | Duluk, Jr. |
| 8,717,359 B2 | 5/2014 | Kulas |
| 8,878,856 B1 | 11/2014 | Chentanez |
| 9,001,117 B2 | 4/2015 | Li |
| 9,704,270 B1 | 7/2017 | Main |
| 9,830,741 B2 | 11/2017 | Kilgariff |
| 9,953,453 B2 | 4/2018 | Lynn |
| 10,062,181 B1 | 8/2018 | Longhurst |
| 10,092,843 B1 | 10/2018 | Rabin |
| 10,281,987 B1 | 5/2019 | Yang |
| 10,926,176 B1 | 2/2021 | Snyder |
| 2008/0266286 A1 | 10/2008 | Ramey |

*Primary Examiner* — Jay Trent Liddle
(74) *Attorney, Agent, or Firm* — Esplin & Associates, PC

(57) ABSTRACT

A system and method for facilitating moving particles in a virtual space use depth information that reflects distances of objects in a virtual space to either a ground level or a viewpoint. The depth information may be stored in a set of information. The system detects collisions of particles and other objects based on the depth information, on a frame-by-frame basis.

13 Claims, 5 Drawing Sheets

PHYSICS ENGINE USING DEPTH INFORMATION

FIELD OF THE DISCLOSURE

This disclosure relates to presenting moving particles in a virtual space, and, in particular, to using depth information to detect whether particles collide with objects within the virtual space.

BACKGROUND

A system that facilitates simulations of certain types of physical phenomena in a virtual space is also known as a physics engine. The physical phenomena may be referred to as physical systems, and may include gravity, collision detection, rigid body dynamics, soft body dynamics, fluid dynamics, rotation calculation, particle physics, weather phenomena, dust, smoke, explosions, fracturing of objects, and/or other physical phenomena, as well as combinations thereof. A physics engine that performs and/or supports particle physics may be referred to as a particle engine.

In some case, computing platforms require a lot of computational power to implement a physics engine. In some cases, computing platforms dedicate specialized hardware to implement a physics engine, such as a physics processing unit.

SUMMARY

One aspect of the disclosure relates to facilitating moving particles, as well as other physical phenomena, in a virtual space. In particular, the disclosure relates to collision detection between particles and other objects. In some implementations, a system configured to present moving particles during interactive gameplay on a client computing platform may include one or more processors, electronic storage, one or more networks, one or more client computing platforms, one or more external resources, and/or other components. As used herein, the term "processor" is used interchangeably with the term "physical processor." The one or more processors may be configured by instructions to execute and/or implement one or more computer program components. The computer program components may include one or more of a space component, a depth component, a storage component, a particle component, a collision component, a barrier component, and/or other components.

The space component may be configured to execute an instance of a virtual space. The space component may implement the instance of the virtual space to facilitate participation by users in the virtual space. The virtual space may include one or more of a two-dimensional space, a three-dimensional space, and/or other virtual space. The instance of the virtual space may include virtual space content determined based on individual virtual space content associated with individual objects and the arrangement(s) of the objects, and/or other information. The space component may use the instance of the virtual space to facilitate presentation of one or more views of the virtual space to a user. The space component may use the instance of the virtual space to enable a user to interact with the virtual space. In some implementations, the execution of the instance of the virtual space may include the space component executing an instance of a game within the virtual space.

The space component may be configured to receive user requests to initiate actions at locations within the virtual space. A user request to initiate an action in the virtual space may specify an action type associated with the requested action. The action type may be used to obtain a function, method, routine, software component or components, and/or any other means that may be used to execute the requested action. Examples of an action type may include, but not limited to, moving, turning, defending, attacking, mining, logging, farming, managing, surveying, training, researching, constructing, recruiting and/or any other action types appropriate for the virtual space. A user request to initiate an action may also specify one or more virtual space objects and/or characters to be acted on, for example, specific buildings (e.g., farm, bank, barrack, mill, lumber yard, etc.), resources (e.g., iron, gold, oil, coal, etc.), troop, knights and so on.

The space component may be configured to execute user requested actions at virtual space locations in an instance of the virtual space. The virtual space locations may include, but not limited to, areas designated as a city, realm, kingdom, state, nation, culture or the like, tiles for improvements (e.g., resource tiles that may be mined, food tiles that may be farmed, land tile that may be used to construct buildings, etc.), topology (e.g., road, hill, ocean, desert, lake, swamp, etc.), and/or any other locations appropriate for the virtual space.

The space component may be configured to receive user requests to participate in activities in the virtual space and execute those activities. The user requested activities may include, but is not limited to, initiating virtual space transactions (e.g., buying or selling virtual items, ordering services provided by the virtual space, and/or any other virtual space transactions), partaking in a game, mission, quest, campaign, expedition, training, tutorial, research and/or so on in the virtual space, consulting a virtual space expert (e.g., asking virtual consultants questions about performing diplomacy in the virtual space), messaging other users (e.g., texting, text chatting, voice chatting, etc.), convening (e.g., conducting an alliance meeting, voting in an alliance meeting, etc.), and/or any other virtual space activities.

The system may be configured to generate, store, use, and/or process different types of information, including but not limited to depth information, particle information, and/or other types of information. Depth information may reflect distances between objects and a particular point, a particular level (e.g. ground level), and/or a particular object. The objects may be defined at a location and/or orientation within a multi-dimensional volume in a virtual space. For example, an object may have a particular location within a three-dimensional volume in the virtual space. In some implementations, objects may further be defined by one or more of mass, heading, velocity, and/or other characteristics. For example, depth information may reflect distances between objects and a ground level. For example, depth information may reflect distances between objects and a viewpoint. The viewpoint may represent the location of a camera or eye. Particle information may reflect one or more of location, orientation, mass, heading, velocity, and/or other characteristics of one or more particles. Examples of particles may include smoke, dust, sparks, exploded objects, fractured objects, and/or other sets of objects moving simultaneously, in particular small objects).

One or more types of information may be stored in an electronic file. One or more types of information may be stored in a set of information. For example, a combination of depth information, particle information, and/or other information may be stored in an electronic file and/or set of information referred to as a depth map. In some implementations, depth information and particle information may be stored in one or more electronic files. In some implementations, depth information and particle information may be stored in one or more sets of information.

The depth component may be configured to obtain, determine, and/or generate depth information. The depth component may be configured to obtain, determine, and/or generate particle information. The depth component may be configured to obtain, determine, and/or generate one or more electronic files and/or sets of information. For example, the depth component may generate a set of information that includes depth information, particle information, and/or other information. For example, depth information may reflect distances between objects in a three-dimensional volume in a virtual space and a viewpoint, e.g. positioned above and/or otherwise outside the three-dimensional volume.

In some implementations, the depth information may be limited to those portions of objects that are visible from the viewpoint. In some implementations, the depth information may be limited to those portions of objects such that a line of sight between the portions and the viewpoint is uninterrupted. For example, the objects in a particular three-dimensional volume in a particular virtual space may include a sphere. The particular viewpoint may be far above the particular three-dimensional volume (e.g. at a distance greater than ten times the maximum height within the particular three-dimensional volume). As viewed from the particular viewpoint, the portion of the sphere that is visible and/or has an uninterrupted line-of-sight is about half of the sphere. The bottom half of the sphere would not be visible from the particular viewpoint. The depth information may be limited to the visible portion of the sphere. In some implementations, objects and/or portions of objects below and/or underneath the sphere may not be visible from the particular viewpoint. The depth information may exclude those objects and/or portions of objects. In some implementations, depth information may be determined by using a grid projected from the particular viewpoint to the particular three-dimensional volume. For individual points on the grid, an imaginary line connects to and/or intersects with the particular viewpoint. For an individual imaginary line, at least the object and/or portion of an object that is closest to the particular viewpoint and that intersects the individual imaginary line may be used to determine the depth information corresponding to an individual point of the grid.

The storage component may be configured to store information, including but not limited to depth information, particle information, set of information, depth maps, and/or other information. In some implementations, the storage component may be configured to store information in electronic storage. In some implementations, the storage component may be configured to store information in one or more electronic files. In some implementations, the storage component may be configured to retrieve information. In some implementations, the storage component may be configured to transfer information between different components of the system.

The particle component may be configured to determine and/or update locations, directions, and/or other information defining particles. In some implementations, the particle component may be configured to obtain particle information that reflects locations and headings of particles in a virtual space. For example, a particular set of particle information may correspond to a particular set of particles. For example, a particular set of particle information may correspond to a particular moment in time, e.g. a particular frame. The particle component may be configured to generate, determine, and/or otherwise derive updated locations and directions for a set of particles. For example, the updated locations and directions may correspond to a subsequent moment in time, e.g. a subsequent frame. In some implementations, such updated particle information may be determined by performing operations on a depth map and/or another electronic file. By way of non-limiting example, the operations may be performed by specialized graphics hardware (e.g. a GPU) including texture mapping hardware (e.g., a stage and/or component of a graphics pipeline configured to perform texture operations).

The updated locations and directions may be referred to as an updated set of particle information. In some implementations, the particle component may be configured to repeatedly determine updated sets of particle information. The updated sets of particle information may correspond to a period or duration in time that spans multiple frames and/or moments. In some implementations, an updated set of particle information may be combined and/or grouped together with other information, including but not limited to depth information. In some implementations, an updated set of particle information may be stored in electronic storage.

The collision component may be configured to detect collisions in a virtual space. Collisions may occur between objects, between particles, and/or between particles and objects. Collision detection may be based on comparing locations of objects and/or particles. In some implementations, collision detection may be based on movement of objects and/or particles relative to other objects and/or particles. For example, the movement of a particular particle may be derived from its location in subsequent frames and/or sets of particular information. Collision detection may be based on determining whether such movement would intersect any objects. In some implementations, a collision of a particle may effectuate a reflection and/or bouncing of the particle. In some implementations, the collision component may be configured to alter and/or update a set of particle information based on detected collisions.

The barrier component may be configured to detect and/or determine barriers in a virtual space. For example, the barrier component may be configured to detect a vertical barrier within a three-dimensional volume in a virtual space. In some implementations, the barrier component may be configured to perform its operations based on depth information. For example, a vertical barrier such as a wall may be detected and/or inferred based on a change in depth information among adjacent and/or proximate objects in a depth map.

As used herein, any association (or relation, or reflection, or indication, or definition, or correspondency) involving objects, particles, depth information, light maps, surfaces, pixels, vertices, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine"

(and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 3-4A-4B illustrate depictions of virtual spaces and/or objects within virtual spaces that may be used by a system configured to present moving particles during interactive gameplay, in accordance with one or more implementations.

DETAILED DESCRIPTION

Figure 1:
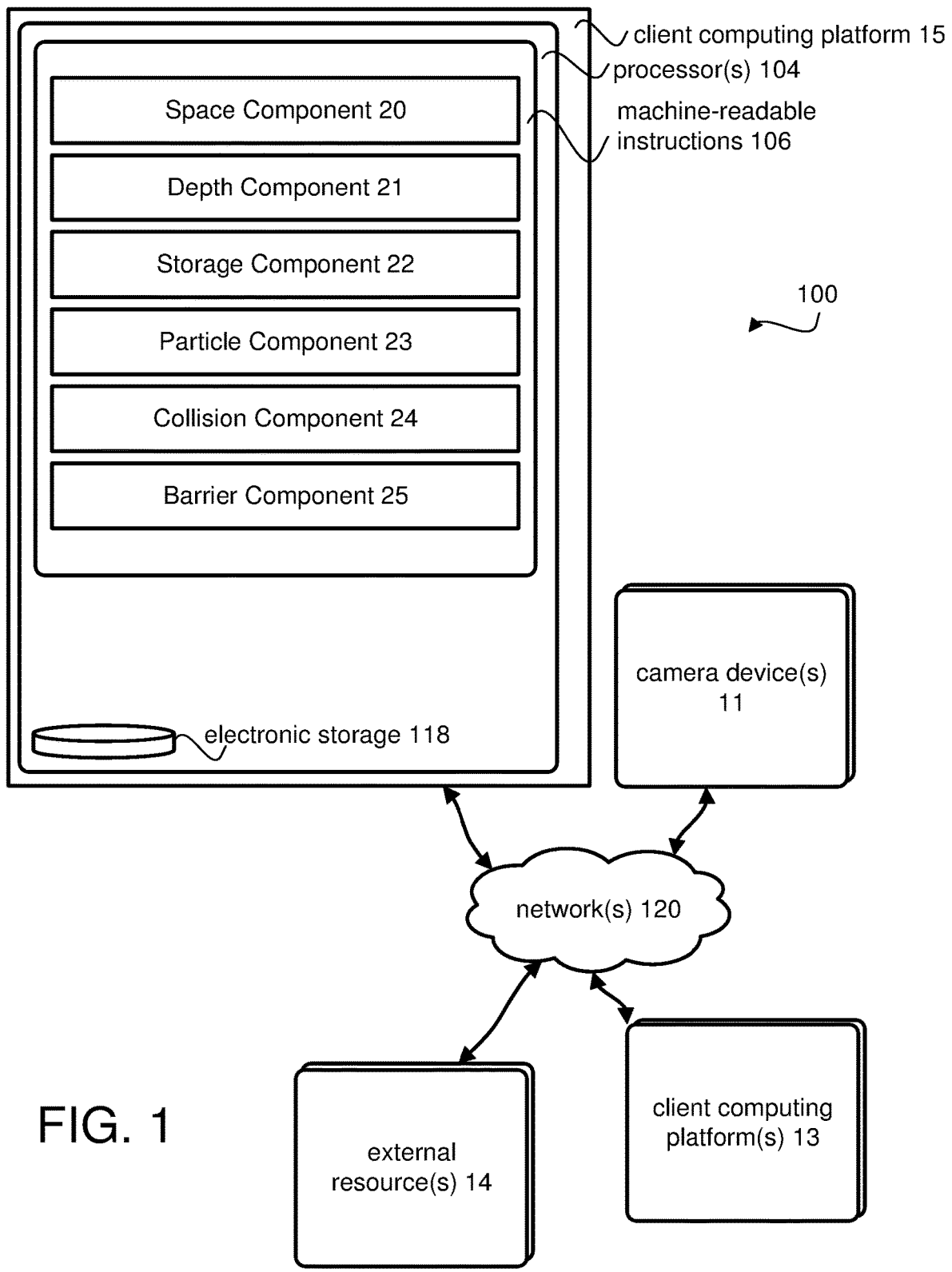
FIG. 1 illustrates an exemplary system configured to present moving particles during interactive gameplay, in accordance with one or more implementations.

FIG. 1 illustrates a system 100 configured to facilitate moving particles, as well as other physical phenomena, in a virtual space. System 100 may be configured to present moving particles during interactive gameplay on a client computing platform 15. System 100 may include one or more processors 104, electronic storage 118, one or more networks 120, one or more other client computing platforms 13, one or more external resources 14, and/or other components. Users may access system 100 and/or the virtual space via client computing platform 15 and/or other client computing platforms 13. As used herein, the term "gameplay" refers to use by one or more users of one or more virtual spaces through client computing platform 15 and/or other client computing platforms 13, and does not limit the use to games. As used herein, the phrase "multi-user gameplay" refers to use by multiple users of one or more virtual spaces through multiple platforms selected from client computing platform 15 and/or other client computing platforms 13, and does not limit the use to games. In some implementations, individual ones of the client computing platforms may correspond to individual ones of the users.

Client computing platform 15 and/or processors 104 may be configured to execute one or more computer program components. The computer program components may include one or more of a space component 20, a depth component 21, a storage component 22, a particle component 23, a collision component 24, a barrier component 25, and/or other components. In some implementations, the functionality attributed to one or more components may be performed by different computing platforms, e.g. remote from other components. For example, some functionality may be performed by a first server (e.g., an interactive server, a server used at runtime, and/or a server used during gameplay), while other functionality may be performed by a different server and/or an offline server (e.g., prior to gameplay and/or not at runtime). In some implementations, the functionality attributed to one or more components may be performed at different times, e.g. by offline servers and/or prior to gameplay and/or not at runtime.

System 100 may be configured to manage one or more user accounts, user profiles, and/or user information associated with users of the system 100. The one or more user accounts, user profiles, and/or user information may include information stored by system 100, one or more of client computing platforms 13, and/or other storage locations.

Space component 20 may be configured to execute an instance of a virtual space. Space component 20 may implement the instance of the virtual space to facilitate participation by users in the virtual space. The virtual space may include one or more of a multi-dimensional space, a two-dimensional space, a three-dimensional space, and/or other virtual space. The instance of the virtual space may include virtual space content determined based on individual virtual space content associated with individual objects and the arrangement(s) of the objects, and/or other information. As used herein, the term objects may include static, moveable, and moving objects and characters. Space component 20 may use the instance of the virtual space to facilitate presentation of one or more views of the virtual space to a user. Space component 20 may use the instance of the virtual space to enable a user to interact with the virtual space. In some implementations, the execution of the instance of the virtual space may include space component 20 executing an instance of a game within the virtual space.

Figure 3:
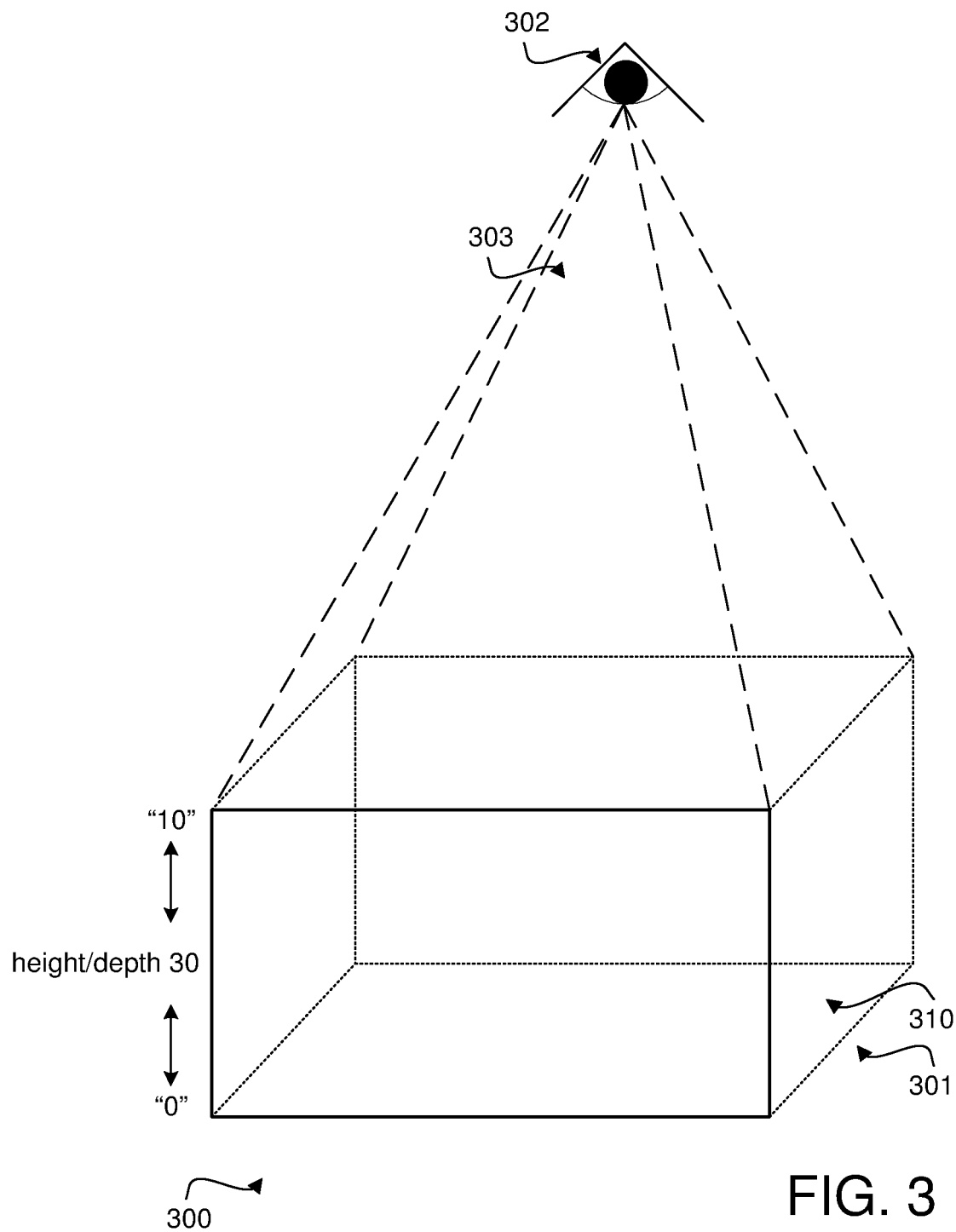

By way of non-limiting example, FIG. 3 illustrates a depiction 300 of a virtual space that may be used by a system configured to facilitate presentation of moving particles, as well as other physical phenomena, during interactive gameplay. The virtual space may include a multi-dimensional volume 301 bounded by multiple walls, a ground level 310, and a ceiling, a viewpoint 302, and/or other objects. Viewpoint 302 represents the location of a camera or eye. A viewing area 303, illustrated by a cone or triangle originating from viewpoint 302, represents a section of depiction 300 that is visible from viewpoint 302 at a particular moment. As depicted, viewpoint 302 is located outside of and above the multi-dimensional volume 301, but this is not intended to be limiting. Viewpoint 302 need not represent the location of a camera or eye of a user in the virtual space, but rather is used to obtain, determine, and/or generate depth information, a depth map, and/or other types of information that may be subsequently used to detect collisions between particles and/or other objects within the virtual space. Depiction 300 may include and/or otherwise be associated with a height/depth 30, which may be represented numerically. By way of non-limiting example, height/depth 30 within multi-dimensional volume 301 may be represented by numbers ranging from 0 to 10, though these numbers are merely exemplary and not intended to be limiting. The height or depth of objects within multi-dimensional volume 301 may range from 0 to 10. For example, if a bouncing object (not shown in FIG. 3) were placed at a particular height within multi-dimensional volume 301, and gravity were simulated to mimic real-world physics, the bouncing object would accelerate downward towards ground level 310, collide with ground level 310, and subsequently move upward and away from ground level 310. In some implementations, the bouncing object would reach a height below the particular height of origin, and repeatedly bounce until it stopped moving. The collision between the bouncing object and any other object, including the ground or ground level 310, may be detected by a collision component such as collision component 24. By way of non-limiting example, this collision may be detected between subsequent frames or moments if the expected or projected height of the bouncing object during its downward acceleration would result in a current height or depth below "0", below ground level 310, and/or otherwise outside of multi-dimensional volume 301. Such a collision may initiate a bounce of the bouncing object.

Referring to FIG. 1, space component 20 may be configured to receive user requests to initiate actions at locations within the virtual space. A user request to initiate an action in the virtual space may specify an action type associated with the requested action. The action type may be used to obtain a function, method, routine, formula, software component or components, and/or any other means that may be used to execute the requested action. A user request to initiate an action may also specify one or more virtual space objects and/or characters to be acted on.

Space component 20 may be configured to execute user requested actions at virtual space locations in an instance of the virtual space. The virtual space locations may include, but not limited to, areas and/or locations appropriate for the virtual space.

Space component 20 may be configured to receive user requests to participate in activities in the virtual space and execute those activities. The user requested activities may include, but is not limited to, initiating virtual space transactions, partaking in a game, mission, quest, campaign, expedition, training, tutorial, research and/or so on in the virtual space, consulting a virtual space expert, messaging other users, convening, and/or any other virtual space activities.

The disclosure of the virtual space determined from the instance executed by space component 20 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space component 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands provided by the users through client computing platform 15 and/or other client computing platforms 13. The control inputs and/or commands provided by the user may specify an action involving controlled elements at a virtual space location. Such a user-initiated action in the virtual space may change the state of the virtual space at an instance when the action is executed in the virtual space. Such a user-initiated action in the virtual space may change views of the virtual space when the action is executed in the virtual space.

The users may interact with each other through communications exchanged within the virtual space. Such communications may include one or more of textual chat, instant messages, private messages, voice communications, and/or other communications. Communications may be received and entered by the users via their respective client computing platforms 13. Communications may be routed to and from the appropriate users.

System 100 may be configured to generate, store, use, and/or process different types of information, including but not limited to depth information, particle information, and/or other types of information. Depth information may reflect distances between objects and a particular (view)point, a particular level (e.g. ground level), and/or a particular object. The objects may be defined at a location and/or orientation within a multi-dimensional volume in a virtual space. For example, an object may have a particular location within a three-dimensional volume in the virtual space. In some implementations, objects may further be defined by one or more of mass, heading, velocity, and/or other characteristics. For example, depth information may reflect distances between objects and a ground level, e.g. ground level 310 as depicted in FIG. 3. For example, depth information may reflect distances between objects and a viewpoint. The viewpoint may represent the location of a camera or eye, e.g. viewpoint 302 as depicted in FIG. 3. Particle information may reflect one or more of location, orientation, mass, heading, velocity, and/or other characteristics of one or more particles. Examples of particles may include smoke, dust, sparks, exploded objects, fractured objects, and/or other sets of objects moving simultaneously, in particular small objects). As used herein, depth information may have one or more different granularities. For example, in some implementations, depth information may be associated with and/or defined per object. Alternatively, and/or simultaneously, in some implementations, depth information may be associated with and/or defined per section or portion of an object. For example, depth information may be associated with and/or defined per pixel, vertex, grid point, and/or surface.

One or more types of information may be stored in an electronic file. One or more types of information may be stored in a set of information. For example, a combination of depth information, particle information, and/or other information may be stored in an electronic file and/or set of information referred to as a depth map. In some implementations, depth information and particle information may be stored in one or more electronic files. In some implementations, depth information and particle information may be stored in one or more sets of information. In some implementations, particle information may be stored and/or formatted in such a way that operations in a graphics pipeline (including but not limited to texture operations) may be used to determine updated location, orientation, mass, heading, velocity, and/or other characteristics of one or more particles. For example, the graphics pipeline may perform a texture operation to perform, e.g., a blending operation. By virtue of the formatting of the particle information of a particular set of particles, the resulting output generated by the graphics pipeline may be interpreted as updated locations, headings, and/or other characteristics of the particular set of particles. As used herein, such updated information may correspond to a subsequent moment in time, e.g. a subsequent frame. In some implementations, system 100 may use different depth maps for different types of objects. For example, a first depth map may be used for static features such as buildings, and a second depth map may be used for moveable and/or moving objects such as characters.

Depth component 21 may be configured to obtain, determine, and/or generate depth information. Depth component 21 may be configured to obtain, determine, and/or generate particle information. Depth component 21 may be configured to obtain, determine, and/or generate one or more electronic files and/or sets of information. For example, depth component 21 may generate a set of information that includes depth information, particle information, and/or other information. For example, depth information may reflect distances between objects in a three-dimensional volume in a virtual space and a viewpoint, e.g. positioned above and/or otherwise outside a three-dimensional volume (e.g., multi-dimensional volume 301 as depicted in FIG. 3). In some implementations, depth information of non-particle objects and particle information may be stored in different sets of information and/or different electronic files.

In some implementations, the depth information may be limited to those portions of objects that are visible from the viewpoint. In some implementations, the depth information may be limited to those portions of objects such that a line of sight between the portions and the viewpoint is uninterrupted. For example, the objects in a particular three-dimensional volume in a particular virtual space may include a sphere. The particular viewpoint may be far above the particular three-dimensional volume (e.g. at a distance greater than ten times the maximum height within the particular three-dimensional volume). As viewed from the particular viewpoint, the portion of the sphere that is visible and/or has an uninterrupted line-of-sight is about half of the sphere. The bottom half of the sphere would not be visible from the particular viewpoint. The depth information may be limited to the visible portion of the sphere. In some implementations, objects and/or portions of objects below and/or underneath the sphere may not be visible from the particular viewpoint. The depth information may exclude those objects and/or portions of objects. In some implementations, the depth information may exclude certain types of objects, such as, by way of non-limiting example, particles.

In some implementations, depth information may be determined by using a grid projected from the particular viewpoint to the particular three-dimensional volume. For individual points on the grid, an imaginary line connects to and/or intersects with the particular viewpoint. For an individual imaginary line, at least the object and/or portion of an object that is closest to the particular viewpoint and that intersects the individual imaginary line may be used to determine the depth information corresponding to an individual point of the grid. In some implementations, the objects used to determine the depth information may exclude certain types of objects, such as, by way of non-limiting example, particles.

Figure 4A:
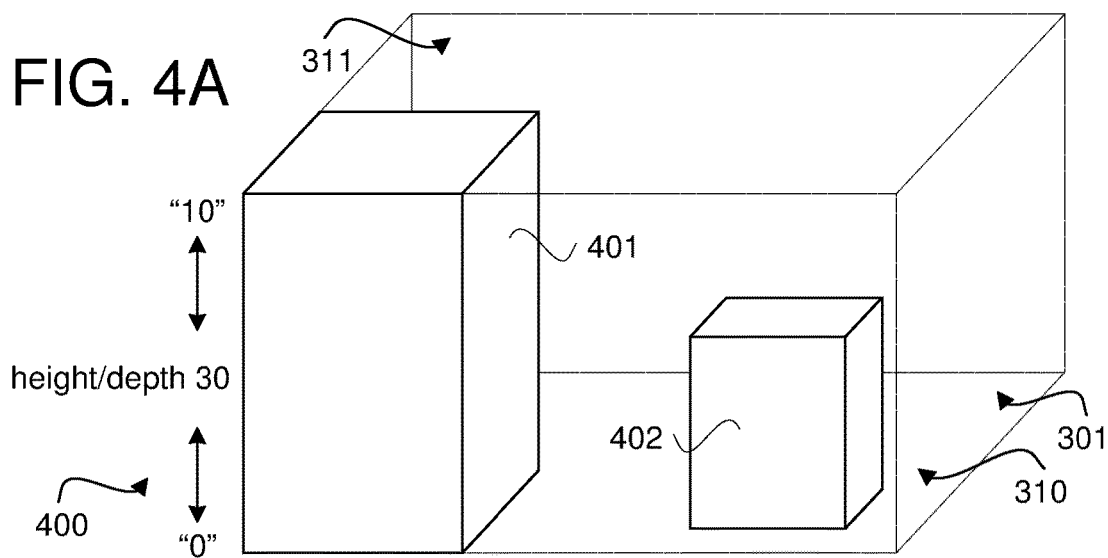
Figure 4B:
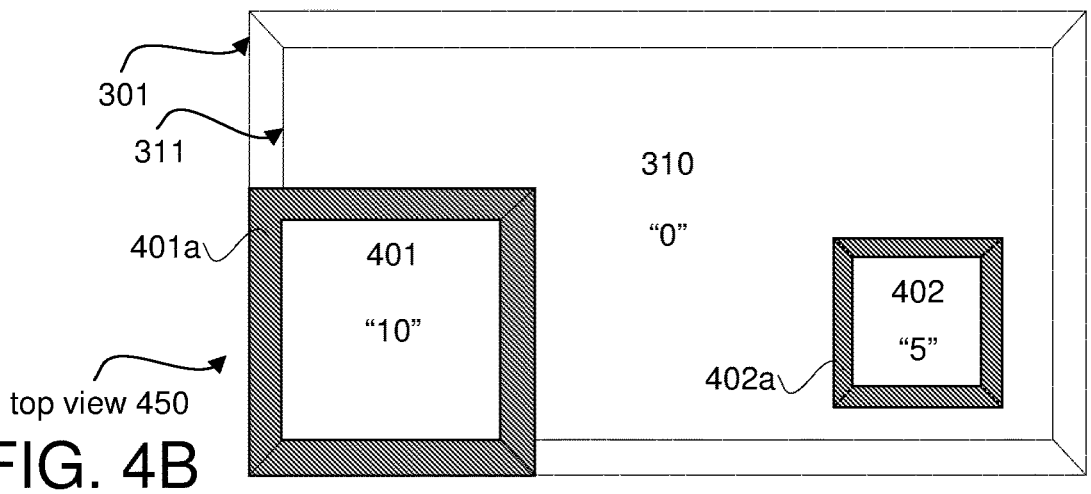

By way of non-limiting example, FIGS. 4A-4B illustrate depictions 400 (from the side) and 450 (from the top, also referred to as "top view 450") of a virtual space that may be used by a system configured to facilitate presentation of moving particles, as well as other physical phenomena, during interactive gameplay. The virtual space may include multi-dimensional volume 301 bounded by multiple walls, ground level 310 (similar to FIG. 3), and a ceiling 311, a first object 401, a second object 402, and/or other objects. By way of non-limiting example, height/depth 30 within multi-dimensional volume 301 in FIGS. 4A-4B may be represented by numbers ranging from 0 to 10, though these numbers are merely exemplary and not intended to be limiting. As depicted in FIG. 4A, first object 401 may reach a height of "10" and second object 402 may reach a height of "5". Top view 450 of FIG. 4B may represent a view of the same multi-dimensional volume 301 as depicted in FIG. 4A, but as seen from a viewpoint located high above multi-dimensional volume 301. For example, a viewpoint similar to viewpoint 302 of FIG. 3. From this viewpoint, the top of first object 401 may be at a height of "10", the top of second object 402 may be at a height of "5" and ground level 310 may be at a height of "0". The sides of first object 401 may be represented in top view 450 as area 401a (the shaded/gray area), which may be at a height that ranges from "10" on the inner boundary to "0" on the outer boundary of area 401a. The sides of second object 402 may be represented in top view 450 as area 402a (the shaded/gray area), which may be at a height that ranges from "5" on the inner boundary to "0" on the outer boundary of area 402a. Ceiling 311 may be at a height of "10". Ground level 310 may be at a height of "0". If the viewpoint of top view 450 is located further away from multi-dimensional volume 301, area 401a and area 402a will be smaller.

Figure 4C:
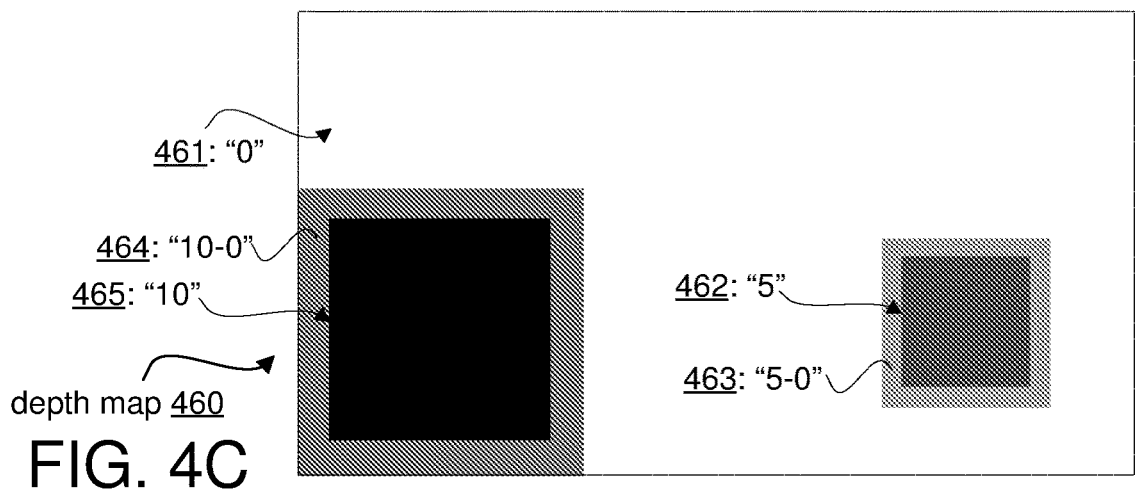
FIG. 4C illustrates a depiction of depth information that may be used by a system configured to present moving particles during interactive gameplay, in accordance with one or more implementations.

In some implementations, top view 450 may be used to determine and/or generate depth information and/or a depth map by storing the height/depth information as described. For example, a depth map based on FIG. 4B may merely include a height of "0" for ground level, heights of "10" and "5" for the areas that correspond to the location of first object 401 and second object 402, and gradient heights ranging from "10" to "0" for area 401a, and from "5" to "0" for area 402a. No actual objects need to be included in such a depth map, but rather the heights that correspond to objects are included. For example, FIG. 4C illustrates a depth map 460 that may have been determined and/or generated from top view 450. As depicted in FIG. 4C, a darker section may represent a greater height than a lighter section. For example, section 461 may represent a height of "0" or ground level, section 462 may represent a height of "5", section 463 may represent a height that is a gradient from "5" to "0", section 465 may represent a height of "10", and section 464 may represent a height that is a gradient from "10" to "0". The different sections of depth map 460 may correspond to the different objects and areas in top view 450, as may be apparent by superimposing FIG. 4B and FIG. 4C.

In some implementations, the depth information may reflect a distance from a viewpoint to the tops of objects and/or from the viewpoint to a section of the ground level in case no object is located between the section and the viewpoint. For example, such depth information may not include the same distance for the entire top of first object 401 because the corners closest to the walls of multi-dimensional volume 301 are further away from the viewpoint than a corner that is closer to the center of multi-dimensional volume 301.

Referring to FIG. 1, storage component 22 may be configured to store information, including but not limited to depth information, particle information, set of information, depth maps, and/or other information. In some implementations, storage component 22 may be configured to store information in electronic storage 118. In some implementations, storage component 22 may be configured to store information in one or more electronic files. In some implementations, storage component 22 may be configured to retrieve information. In some implementations, storage component 22 may be configured to transfer information between different components of system 100.

Particle component 23 may be configured to determine and/or update locations, directions, and/or other information defining particles. In some implementations, particle component 23 may be configured to obtain particle information that reflects locations and headings of particles in a virtual space. For example, a particular set of particle information may correspond to a particular set of particles. For example, a particular set of particle information may correspond to a particular moment in time, e.g. a particular frame. Particle component 23 may be configured to generate, determine, and/or otherwise derive updated locations and directions for a set of particles. For example, the updated locations and directions may correspond to a subsequent moment in time, e.g. a subsequent frame. In some implementations, such updated particle information may be determined by performing operations on a depth map and/or another electronic file. In some implementations, such updated particle information may be determined by performing operations on information that is formatted in a manner similar to a depth map. By way of non-limiting example, the operations may be performed by specialized graphics hardware (e.g. a GPU) including texture mapping hardware (e.g., a stage and/or component of a graphics pipeline configured to perform texture operations).

The updated locations and directions may be referred to as an updated set of particle information. In some implementations, particle component 23 may be configured to repeatedly determine updated sets of particle information. The updated sets of particle information may correspond to a period or duration in time that spans multiple frames. In some implementations, an updated set of particle information may be combined and/or grouped together with other information, including but not limited to depth information. In some implementations, an updated set of particle information may be stored in electronic storage 118.

Figure 5A:
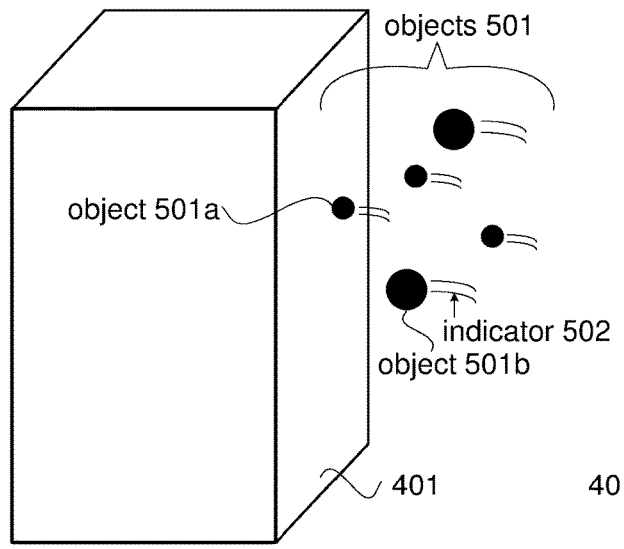
FIGS. 5A-5B-5C-5D illustrate depictions of objects within virtual spaces that may be used by a system configured to present moving particles during interactive gameplay, in accordance with one or more implementations.
Figure 5B:
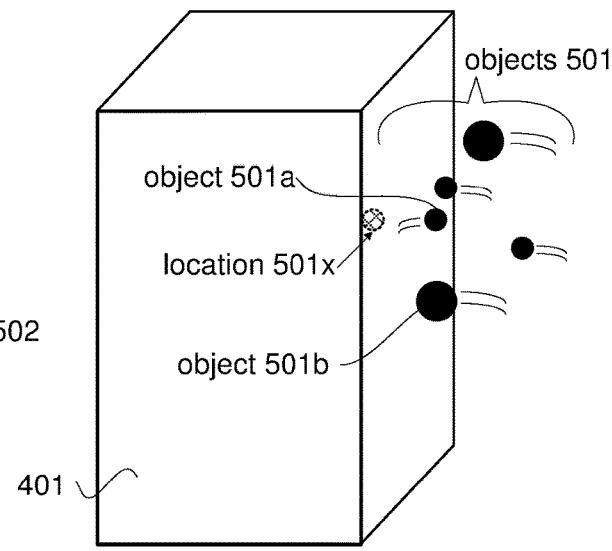

By way of non-limiting example, FIGS. 5A-5B illustrate depictions of objects 501 within a virtual space that may be used by a system configured to present moving particles during interactive gameplay. The virtual space may include an object 401, which may be similar to object 401 in FIGS. 4A-4B. Objects 501 may include a set of objects such as, e.g., particles. Objects 501 may include an object 501a, an object 501b and/or other objects. Depictions of objects 501 may include heading indicators such as indicator 502, e.g. for the purpose of illustrating one or more concepts described in this disclosure. Indicators may be represented by two parallel arcs, as depicted in FIG. 5A. Indicators need not be shown to users during interactive gameplay. The length of an indicator may indicate velocity. The orientation of an indicator may indicate heading. For example, indicator 502 indicates that object 501b is heading to the left. As depicted in FIG. 5A, objects 501 are heading to the left, potentially on a collision course with object 401. In some implementations, FIG. 5A and FIG. 5B may represent subsequent moments of frames within a virtual space. During a first moment or frame, as depicted in FIG. 5A, individual objects 501 are located at a particular distance from object 401 and heading to the left, potentially on a collision course with object 401. Object 401 may be assumed to be stationary in FIG. 5A and FIG. 5B. During a second moment or frame that is subsequent to the first moment or frame, which may be depicted in FIG. 5B, individual objects 501 are located at a second particular distance from object 401 that is generally, for most objects 501 such as object 501b, closer to object 401 than the instance depicted in FIG. 5A. In other words, objects 501 (at least most of them, such as object 501b) have moved closer to object 401 in FIG. 5B.

Referring to FIG. 1, collision component 24 may be configured to detect collisions in a virtual space. Collisions may occur between objects, between particles, and/or between particles and objects. Collision detection may be based on comparing locations of objects and/or particles. In some implementations, collision detection may be based on comparing locations of sections and/or surfaces of objects and/or particles. In some implementations, collision detection may be based on movement of objects and/or particles relative to other objects and/or particles. In some implementations, collision detection may be based on movement of objects and/or particles relative to sections and/or surfaces of other objects and/or particles. For example, the movement of a particular particle may be derived from its location in subsequent frames and/or sets of particular information. Collision detection may be based on determining whether such movement would intersect any objects. Alternatively, and/or simultaneously, collision detection may be based on determining whether such movement would intersect any sections and/or surfaces of objects. In some implementations, a collision of a particle may effectuate a reflection and/or bouncing of the particle. In some implementations, collision component 24 may be configured to alter and/or update a set of particle information based on detected collisions.

By way of non-limiting example, FIG. 5B illustrates a depiction of objects 501 within a virtual space that may be used by a system configured to present moving particles during interactive gameplay. Object 501a may have been moving to the left such that the expected location and/or the updated location of object 501a would be, in the absence of object 401, a location 501x that falls within object 401 (or at least on the opposite side of a particular surface of object 401). System 100 may be configured to detect a collision between object 501a and object 401 based on an analysis of location 501x relative to object 401. In some implementations, system 100 may be configured to bounce object 501a from object 401, such that object 501a has a changed heading compared to its heading prior to the collision. For example, the indicator of object 501a in FIG. 5B depicts that object 501a is heading to the right, whereas other objects in objects 501 are still heading to the left.

Barrier component 25 may be configured to detect and/or determine barriers in a virtual space. For example, barrier component 25 may be configured to detect a vertical barrier within a three-dimensional volume in a virtual space. Other components of system 100, including but not limited to collision component 24, may be configured to perform operations based on barriers that are detected and/or determined by barrier component 25. In some implementations, barrier component 25 may be configured to perform its operations based on depth information. For example, a vertical barrier such as a wall may be detected and/or inferred based on a change in depth information among adjacent and/or proximate objects in a depth map. In some implementations, accuracy of detected and/or inferred vertical barriers may depend on the shape of the objects in the virtual space. For example, vertical barriers of cuboid objects and rectangular prisms may be reliably detected, whereas overhanding structures such as awnings may cause reduced accuracy.

For example, FIG. 4C illustrates a depth map 460 that may be used by barrier component 25. Barrier component 25 may be configured to detect vertical barriers in section 464 and/or section 463 based on the gradient of the height/depth. For example, the short distance between section 465 with height "10" and section 461 with height "0" may indicate the presence of a vertical barrier such as a wall and/or another vertical surface. In some implementations, barrier component 25 may be configured to determine and/or obtain a derivative depth map that defines, at individual points corresponding to a depth map, the change in height and/or the rate of change in height. A change in height that exceeds a particular threshold may indicate the presence of a vertical barrier. A rate of change in height that exceeds a particular threshold may indicate the presence of a vertical barrier. In some implementations, a change in height may be determined based on differences of vertical coordinates between multiple proximate objects and/or portions of objects (e.g., a pixel, vertex and/or grid point that is part of an object). In some implementations, a change in height may be determined based on differences of values of multiple proximate points in a depth map (e.g., grid points that are part of a depth map). For example, a derivative depth map may be based on difference of values of adjacent grid points in a depth map.

Referring to FIG. 1, collision component 24 may be configured to detect different types of collisions in a virtual space. For example, collision detection may include collisions of objects moving sideways/laterally that collide with vertical barriers (e.g. the side of an object such as object 401 in FIG. 5B). Such collisions may be detected based on one or more changes in coordinates that indicate lateral position or movement, which may be referred to as "X" and "Y" coordinates. For example, assume that the nearest object or vertical barrier to an individual particle has been identified in a first frame. If the same particle would move to the opposite side of the vertical barrier (or the opposite side of the nearest surface of the nearest object) a collision may be detected.

Figure 5C:
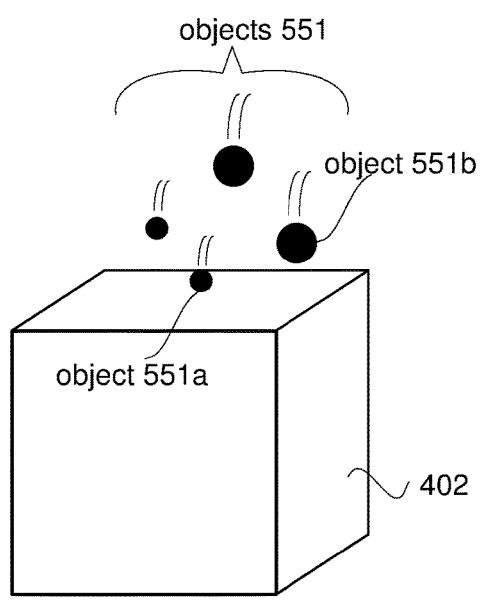
Figure 5D:
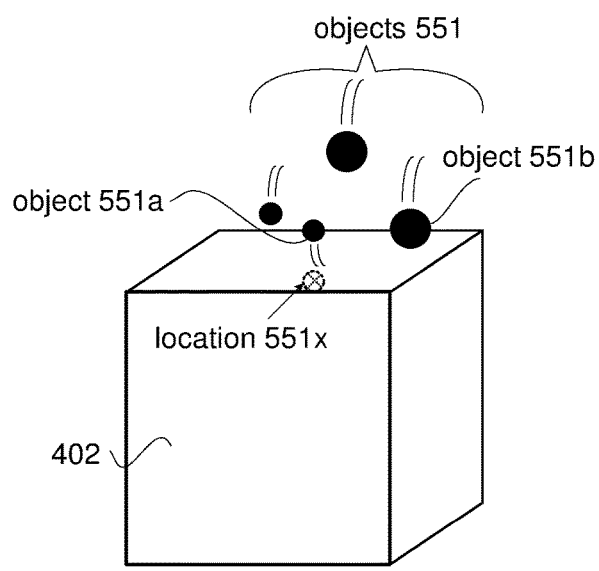

For example, collision detection may include collisions of objects moving vertically that collide with horizontal barriers (e.g. the top of an object such as object 402 in FIG. 5D). Such collisions may be detected based on one or more changes in a coordinate that indicates vertical position or movement, which may be referred to as "Z" coordinate. For example, assume that the nearest object or horizontal barrier to an individual particle has been identified in a first frame. If the same particle would move to the opposite side of the horizontal barrier (or the opposite side of the nearest surface of the nearest object) a collision may be detected. If the same particle would move to the opposite side of the ground level (or the lowest possible level within a particular volume) a collision with the ground or floor may be detected. In some implementations, if the same particle would move to a location that is further away from the viewpoint (used to create the depth information) than a particular portion of an object that is nearest to the individual particle, a collision may be detected. For example, in FIG. 5D, object 551a would move to location 551x, which is further away from the viewpoint (similar to viewpoint 302 in FIG. 3) than the nearest pixel, vertex and/or grid point that is part of the top surface of object 402. In other words, referring to FIG. 5C, collision component 24 may be configured to determine a particular pixel, vertex and/or grid point that is part of the top surface of object 402 and that is closest to object 551a. Assume that particular pixel, vertex and/or grid point has a particular distance "D1" to the viewpoint, which may be stored in the depth map. A collision may be detected responsive to a determination that location 551x (in FIG. 5D) is located at a distance "D2" to the viewpoint and that "D2" is greater than "D1".

For example, collision detection may include collisions of objects moving both laterally and vertically with any other objects or barriers. In some implementations, collision detection of an individual particle with an object or barrier By way of non-limiting example, FIGS. 5C-5D illustrate depictions of objects 551 within a virtual space that may be used by a system configured to present moving particles during interactive gameplay. The virtual space may include an object 402, which may be similar to object 402 in FIGS. 4A-4B. Objects 551 may include a set of objects such as, e.g., particles. Objects 551 may include an object 551a, an object 551b and/or other objects. Depictions of objects 551 may include heading indicators similar to FIGS. 5A-5B. For example, the indicator of object 551b indicates a downward movement. As depicted in FIG. 5C, objects 551 are heading down, potentially on a collision course with object 402. In some implementations, FIG. 5C and FIG. 5D may represent subsequent moments of frames within a virtual space. During a first moment or frame, as depicted in FIG. 5C, individual objects 551 are located at a particular distance from object 402 and heading down, potentially on a collision course with object 402. Object 402 may be assumed to be stationary in FIG. 5C and FIG. 5D. During a second moment or frame that is subsequent to the first moment or frame, which may be depicted in FIG. 5D, individual objects 551 are located at a second particular distance from object 402 that is generally, for most objects 551 such as object 551b, closer to object 402 than the instance depicted in FIG. 5C. In other words, objects 551 (at least most of them, such as object 551b) have moved closer to object 402 in FIG. 5D.

Referring to FIG. 5D, object 551a may have been moving downward such that the expected location and/or the updated location of object 551a would be, in the absence of object 402, a location 551x that falls within object 402 (or at least on the opposite side of the top surface of object 402). System 100 may be configured to detect a collision between object 551a and object 402 based on an analysis of location 551x relative to object 402. In some implementations, system 100 may be configured to bounce object 551a from object 402, such that object 551a has a changed heading compared to its heading prior to the collision. For example, the indicator of object 551a in FIG. 5D depicts that object 551a is heading upwards, whereas other objects in objects 551 are still heading down.

Referring to FIG. 1, collision component 24 may be configured to detect collisions for a set of particles in multiple passes. For example, a first pass of collision detection may be performed using a first depth map for static features and/or objects (e.g. buildings) within a volume in the virtual space. Based on these detected collisions, the locations and directions of a first subset of particles that collided may be updated. For example, a second pass of collision detection may be performed using a second depth map for moving objects (e.g. characters) within the volume in the virtual space. Based on these detected collisions, the locations and directions of a second subset of particles that collided may be updated. Particle component 23 may be configured to combine the updated locations and directions of all particles (including the first subset and the second subset) into a set of updated particle information. For example, particles may bounce and/or reflect from both buildings and characters.

Referring to FIG. 1, client computing platform 15, other client computing platforms 13, and/or external resources 14 may be operatively linked via one or more electronic communication links. For example, such electronic communication links may be established, at least in part, via a network 120 such as the Internet and/or other networks. It will be appreciated that this is not intended to be limiting, and that the scope of this disclosure includes implementations in which client computing platform 15, client computing platforms 13, and/or external resources 14 may be operatively linked via some other communication media.

Client computing platform 15 and/or other client computing platforms 13 may include one or more processors configured to execute computer program components. The computer program components may be configured to enable an expert or user associated with the client computing platform to interface with system 100 and/or external resources 14, and/or provide other functionality attributed herein to client computing platform 15 and/or other client computing platforms 13. By way of non-limiting example, client computing platforms may include one or more of a desktop computer, a laptop computer, a handheld computer, a tablet computing platform, a NetBook, a Smartphone, a gaming console, and/or other computing platforms.

External resources 14 may include sources of information, hosts and/or providers of virtual environments outside of system 100, external entities participating with system 100, and/or other resources. In some implementations, some or all of the functionality attributed herein to external resources 14 may be provided by resources included in system 100.

System 100 may include electronic storage 118, one or more processors 104, and/or other components. System 100 may include communication lines, or ports to enable the exchange of information with network 120 and/or other computing platforms. Illustration of client computing platform 15 in FIG. 1 is not intended to be limiting. Client computing platform 15 may include a plurality of hardware, software, and/or firmware components operating together to provide the functionality attributed herein to client computing platform 15. For example, client computing platform 15 may be implemented by a cloud of computing platforms operating together.

Electronic storage 118 may comprise non-transitory storage media that electronically stores information. The electronic storage media of electronic storage 118 may include one or both of system storage that is provided integrally (i.e., substantially non-removable) with client computing platform 15 and/or removable storage that is removably connectable to client computing platform 15 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 104, information received from client computing platform 15, information received from client computing platforms 13, and/or other information that enables server 15 to function as described herein.

Processor(s) 104 is configured to provide information processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include a plurality of processing units. These processing units may be physically located within the same device, or processor 104 may represent processing functionality of a plurality of devices operating in coordination. The processor 104 may be configured to execute components 20-25 and/or other components. Processor 104 may be configured to execute components 20-25 and/or other components by software; hardware; firmware; some combination of software, hardware, and/or firmware; and/or other mechanisms for configuring processing capabilities on processor 104. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 20-25 are illustrated in FIG. 1 as being implemented within a single processing unit, in implementations in which processor 104 includes multiple processing units, one or more of components 20-25 may be implemented remotely from the other components. The description of the functionality provided by the different components 20-25 described below is for illustrative purposes, and is not intended to be limiting, as any of components 20-25 may provide more or less functionality than is described. For example, one or more of components 20-25 may be eliminated, and some or all of its functionality may be provided by other ones of components 20-25. As another example, processor 104 may be configured to execute one or more additional components that may perform some or all of the functionality attributed below to one of components 20-25.

Figure 2:
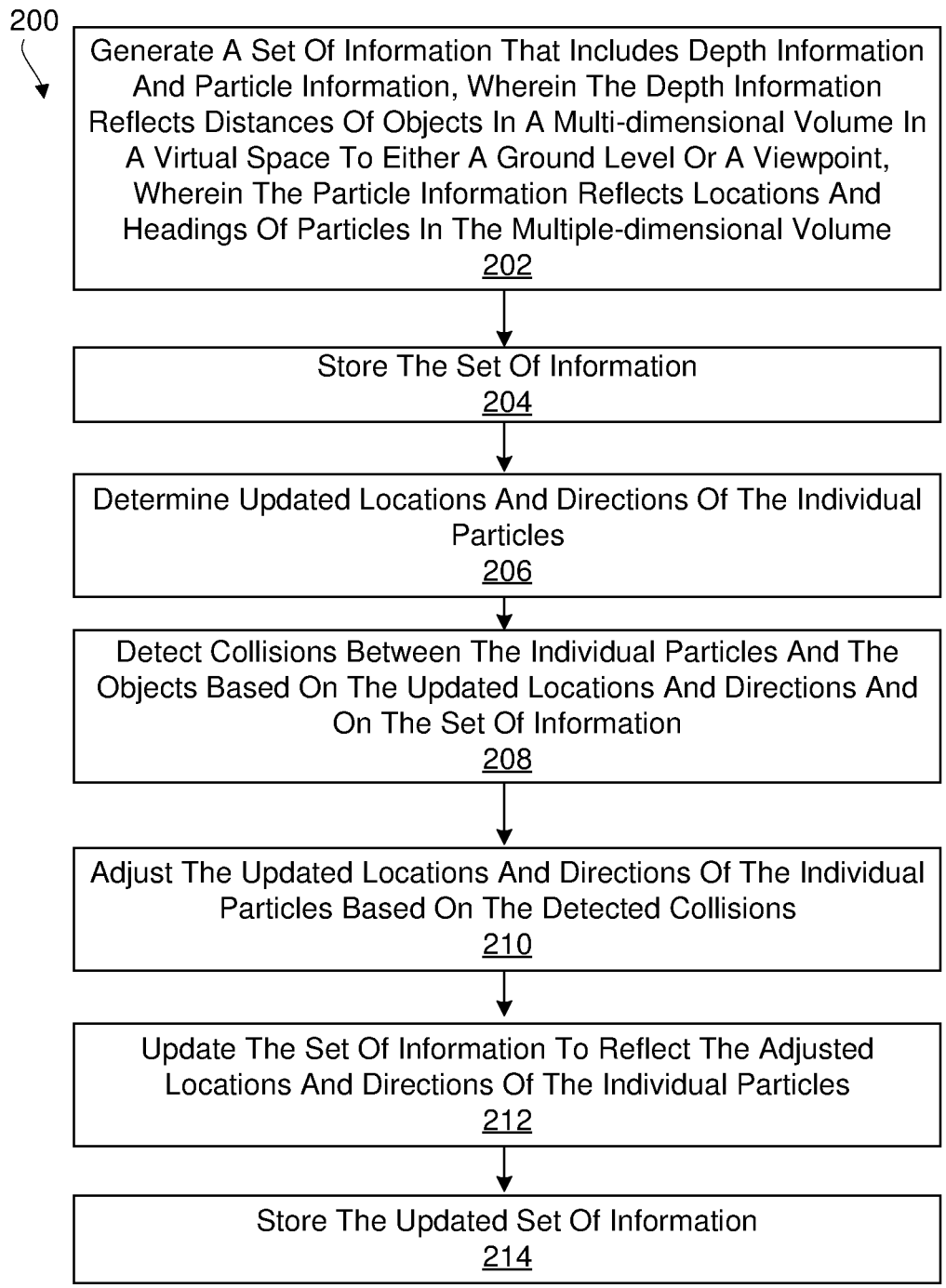
FIG. 2 illustrates an exemplary method of presenting moving particles during interactive gameplay, in accordance with one or more implementations.

FIG. 2 illustrates one exemplary method of facilitating presentation of moving particles during interactive gameplay. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium.

The one or more processing devices may include one or more devices configured through hardware, firmware, and/or software to be specifically designed for execution of one or more of the operations of method 200.

At an operation 202, a set of information is generated that includes depth information and particle information. The depth information reflects distances of objects in a multi-dimensional volume in a virtual space to either a ground level or a viewpoint. The particle information reflects locations and headings of particles in the multiple-dimensional volume. The set of information includes the depth information for portions of the objects in the multiple-dimensional volume that are visible from the viewpoint and further includes the particle information. In some embodiments, operation 202 is performed by a depth component the same as or similar to depth component 21 (shown in FIG. 1 and described herein).

At an operation 204, at least a portion of the set of information is stored on electronic storage. In some embodiments, operation 204 is performed by a storage component the same as or similar to storage component 22 (shown in FIG. 1 and described herein).

At an operation 206, updated locations and directions of the individual particles are determined. In some embodiments, operation 206 is performed by a particle component the same as or similar to particle component 23 (shown in FIG. 1 and described herein).

At an operation 208, collisions are detected between the individual particles and the objects based on the updated locations and directions and on the set of information. In some embodiments, operation 208 is performed by a collision component the same as or similar to collision component 24 (shown in FIG. 1 and described herein).

At an operation 210, the updated locations and directions of the individual particles are adjusted based on the detected collisions. In some embodiments, operation 210 is performed by a particle component the same as or similar to particle component 23 (shown in FIG. 1 and described herein).

At an operation 212, the set of information is updated to reflect the adjusted locations and directions of the individual particles. In some embodiments, operation 212 is performed by a depth component the same as or similar to depth component 21 (shown in FIG. 1 and described herein).

At an operation 214, the updated set of information is stored on electronic storage. In some embodiments, operation 214 is performed by a storage component the same as or similar to storage component 22 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An interactive server system configured to determine locations of moving and colliding particles within a three-dimensional volume in a virtual space during interactive gameplay by one or more players of an instance of a game, wherein the instance of the game takes place in the virtual space, the interactive server system comprising:

electronic storage configured to store depth information and particle information, wherein the depth information reflects distances of objects in the three-dimensional volume in the virtual space to a ground level, and wherein the particle information reflects current locations and current headings of individual particles in the three-dimensional volume;

one or more processors configured by machine-readable instructions to:

store, on electronic storage, a set of information that includes the depth information for portions of the objects in the three-dimensional volume that are visible from a viewpoint and that further includes the particle information;

automatically detect, by a barrier component, locations of vertical barriers within the three-dimensional volume based on differences in vertical coordinates of adjacent objects in the set of information, wherein the vertical barriers include a first vertical barrier having a first location, wherein the first vertical barrier is automatically detected based on changes in the depth information of adjacent objects in the three-dimensional volume in the virtual space;

automatically determine, by a particle component, a first current particle location of a first particle and a first current particle heading of the first particle;

automatically determine, by the particle component, and based on the current locations and the current headings, prospective subsequent locations and prospective subsequent headings of the individual particles, wherein the individual particles include the first particle, wherein the prospective subsequent locations include a first prospective subsequent particle location intended for the first particle;

automatically detect, by a collision component, collisions between the individual particles and the objects based on the prospective subsequent locations and the prospective subsequent headings and further based on the set of information, wherein the collisions include a first collision between the first particle and the first vertical barrier, wherein detection of the first collision is further based on a proximity of the first particle and the first location of the first vertical barrier, wherein the detection of the first collision includes:

a determination that the first current particle location and the first prospective subsequent particle location are on opposite sides of the first vertical barrier;

automatically determine, by the particle component, subsequent locations and subsequent headings of the individual particles based on the detected collisions such that a first subsequent particle location of the first particle and a first subsequent particle heading are determined based on the detection of the first collision, the first prospective subsequent particle location, the first prospective subsequent particle heading, and the first location of the first vertical barrier; and update the set of information to reflect the subsequent locations and the subsequent headings of the individual particles.

2. The system of claim 1, wherein detection of a collision of an individual particle includes:

a determination of a particular portion of the objects that are visible from the viewpoint, wherein the particular portion is nearest to the individual particle; and a detection of a change in a vertical coordinate of the individual particle that indicates that the updated location of the individual particle is further from the viewpoint than the particular portions.

3. The system of claim 1, wherein the portions of the objects include one or both of vertices of the objects and surfaces of the objects.

4. The system of claim 1, wherein determining the prospective subsequent locations and the prospective subsequent headings of the individual particles is accomplished by performing operations on the set of information.

5. The system of claim 4, wherein the operations performed on the set of information are performed by a component of a client computing platform that is configured to perform texture operations.

6. The system of claim 1, wherein the viewpoint has a three-dimensional location, and wherein the three-dimensional location of the viewpoint is positioned above the three-dimensional volume.

7. The system of claim 1, wherein movement of the individual particles simulates physical phenomena in the virtual space, and wherein the individual particles represent one or more of smoke, dust, sparks, exploded objects, and/or fractured objects.

8. A computer-implemented method to determine locations of moving and colliding particles within a three-dimensional volume in a virtual space during interactive gameplay by one or more players of an instance of a game, wherein the instance of the game takes place in the virtual space, the method being implemented in one or more processors configured by machine-readable instructions, the method comprising:

storing a set of information on electronic storage, wherein the set of information includes depth information and particle information, wherein the depth information reflects distances of objects in the three-dimensional volume in the virtual space to a ground level, wherein the particle information reflects current locations and current headings of individual particles in the three-dimensional volume, wherein the set of information includes the depth information for portions of the objects in the three-dimensional volume that are visible from a viewpoint and further includes the particle information;

automatically detecting locations of vertical barriers within the three-dimensional volume based on differences in vertical coordinates of adjacent objects in the set of information, wherein the vertical barriers include a first vertical barrier having a first location, wherein the first vertical barrier is automatically detected based on changes in the depth information of adjacent objects in the three-dimensional volume in the virtual space;

automatically determining a first current particle location of a first particle and a first current particle heading of the first particle;

automatically determining, based on the current locations and the current headings, prospective subsequent locations and prospective subsequent headings of the individual particles, wherein the individual particles include the first particle, wherein the prospective subsequent locations include a first prospective subsequent particle location intended for the first particle;

automatically detecting collisions between the individual particles and the objects based on the prospective subsequent locations and the prospective subsequent headings and further based on the set of information, wherein the collisions include a first collision between the first particle and the first vertical barrier, wherein detection of the first collision is further based on a proximity of the first particle and the first location of the first vertical barrier, wherein the detection of the first collision includes:

determining that the first current particle location and the first prospective subsequent particle location are on opposite sides of the first vertical barrier;

automatically determining subsequent locations and subsequent headings of the individual particles based on the detected collisions such that a first subsequent particle location of the first particle and a first subsequent particle heading are determined based on the detection of the first collision, the first prospective subsequent particle location, the first prospective subsequent particle heading, and the first location of the first vertical barrier; and updating the set of information to reflect the subsequent locations and the subsequent headings of the individual particles.

9. The method of claim 8, wherein detecting a collision of an individual particle includes:

determining a particular portion of the objects that are visible from the viewpoint, wherein the particular portion is nearest to the individual particle; and detecting a change in a vertical coordinate of the individual particle that indicates that the updated location of the individual particle is further from the viewpoint than the particular portions.

10. The method of claim 8, wherein the portions of the objects include one or both of vertices of the objects and surfaces of the objects.

11. The method of claim 8, wherein determining the prospective subsequent locations and the prospective subsequent headings of the individual particles is accomplished by performing operations on the set of information.

12. The method of claim 11, wherein the operations performed on the set of information are performed by a component of a client computing platform that is configured to perform texture operations.

13. The method of claim 8, wherein the viewpoint has a three-dimensional location, and wherein the three-dimensional location of the viewpoint is positioned above the three-dimensional volume.

* * * * *